United States Patent
Takita et al.

(10) Patent No.: US 8,737,839 B2
(45) Date of Patent: May 27, 2014

(54) NETWORK DESIGN APPARATUS, METHOD, AND COMPUTER PRODUCT

(75) Inventors: Yutaka Takita, Kawasaki (JP); Toru Katagiri, Kawasaki (JP); Tomohiro Hashiguchi, Kawasaki (JP); Kazuyuki Tajima, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 304 days.

(21) Appl. No.: 12/858,222

(22) Filed: Aug. 17, 2010

(65) Prior Publication Data

US 2011/0052193 A1   Mar. 3, 2011

(30) Foreign Application Priority Data

Aug. 25, 2009   (JP) .................................. 2009-194103

(51) Int. Cl.
*H04B 10/12*   (2006.01)
(52) U.S. Cl.
USPC .............................. 398/147; 398/159; 398/81
(58) Field of Classification Search
USPC .......................... 398/81, 147, 158, 159, 148
See application file for complete search history.

(56) References Cited

U.S. PATENT DOCUMENTS

| 6,987,903 B2* | 1/2006 | Nakajima et al. ............... 385/24 |
| 7,382,979 B2 | 6/2008 | Akiyama et al. |
| 2005/0116765 A1 | 6/2005 | Sakiyama et al. |

FOREIGN PATENT DOCUMENTS

| JP | 2005-166698 A | 6/2003 |
| WO | WO-2005/006604 | 1/2005 |

* cited by examiner

*Primary Examiner* — M. R. Sedighian
(74) *Attorney, Agent, or Firm* — Fujitsu Patent Center

(57) ABSTRACT

A network design apparatus includes an input unit configured to receive network information that indicates nodes connected by optical transmission paths and path information that indicates paths between the nodes; an design unit configured to perform, based on the network information and the path information, wavelength dispersion compensation design using a constraint condition that a path whose span count is larger than a span count of another path that does not satisfy a transmission condition does not satisfy the transmission condition; and an output unit configured to output a result obtained by the design unit.

12 Claims, 14 Drawing Sheets

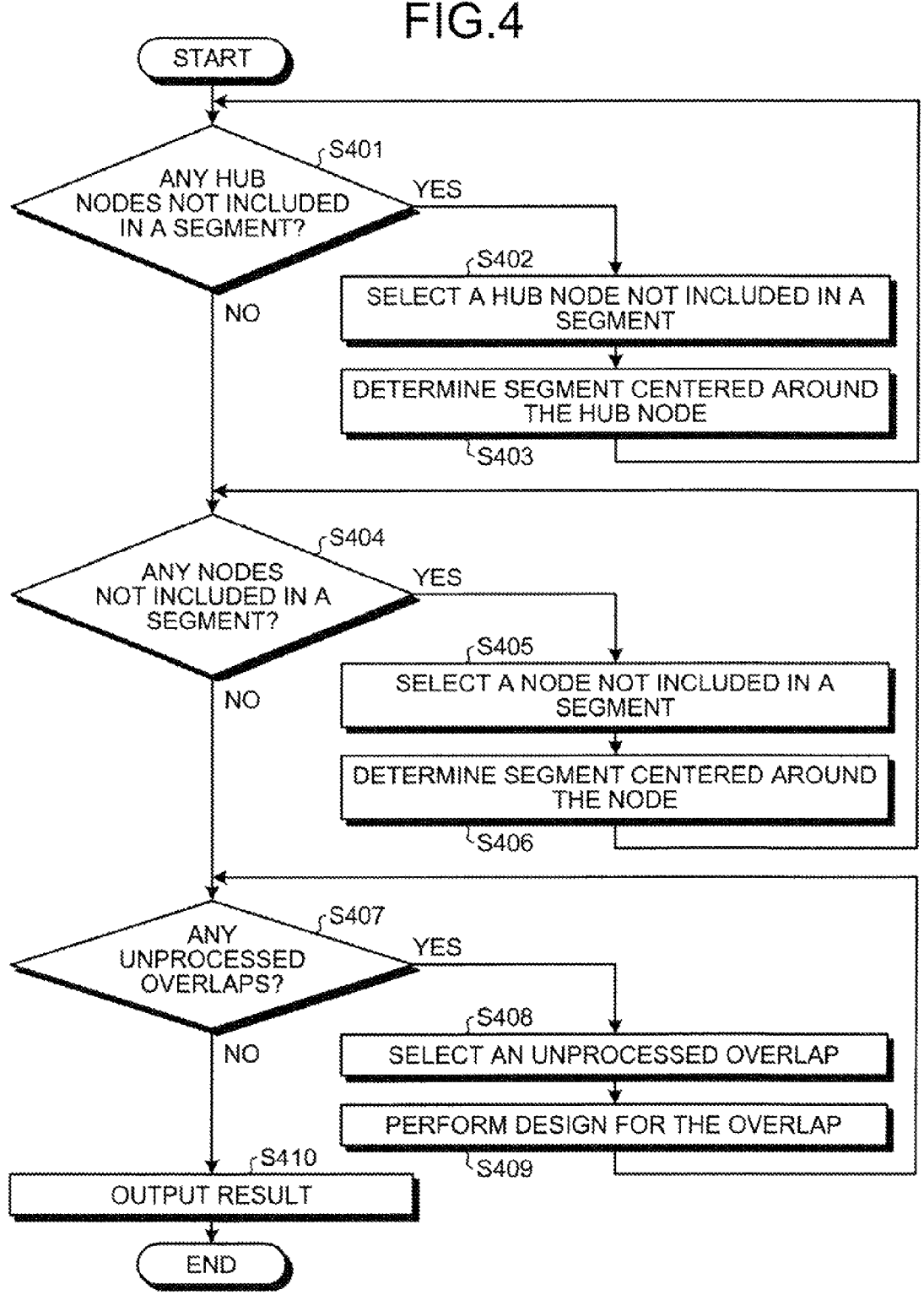

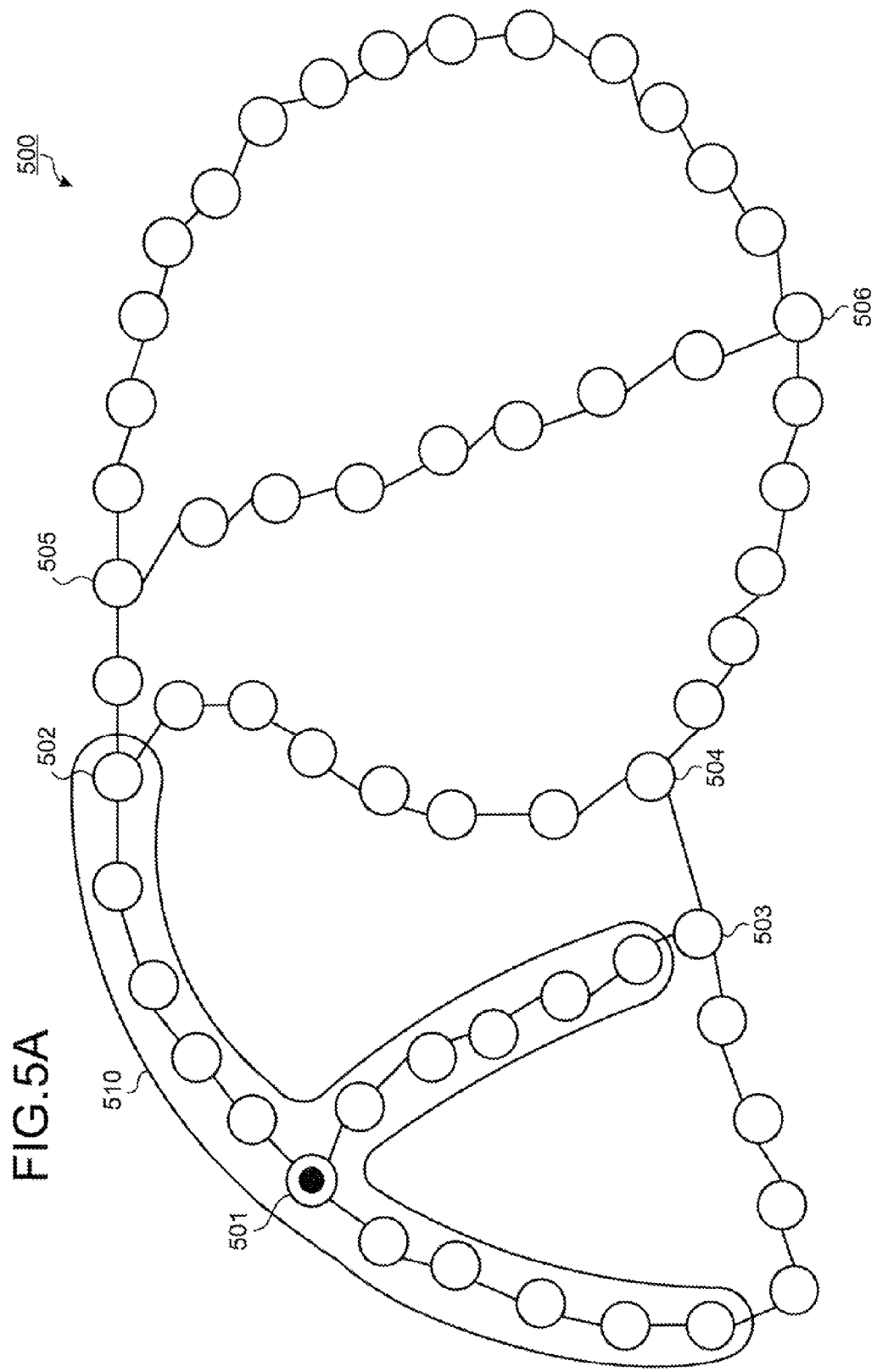

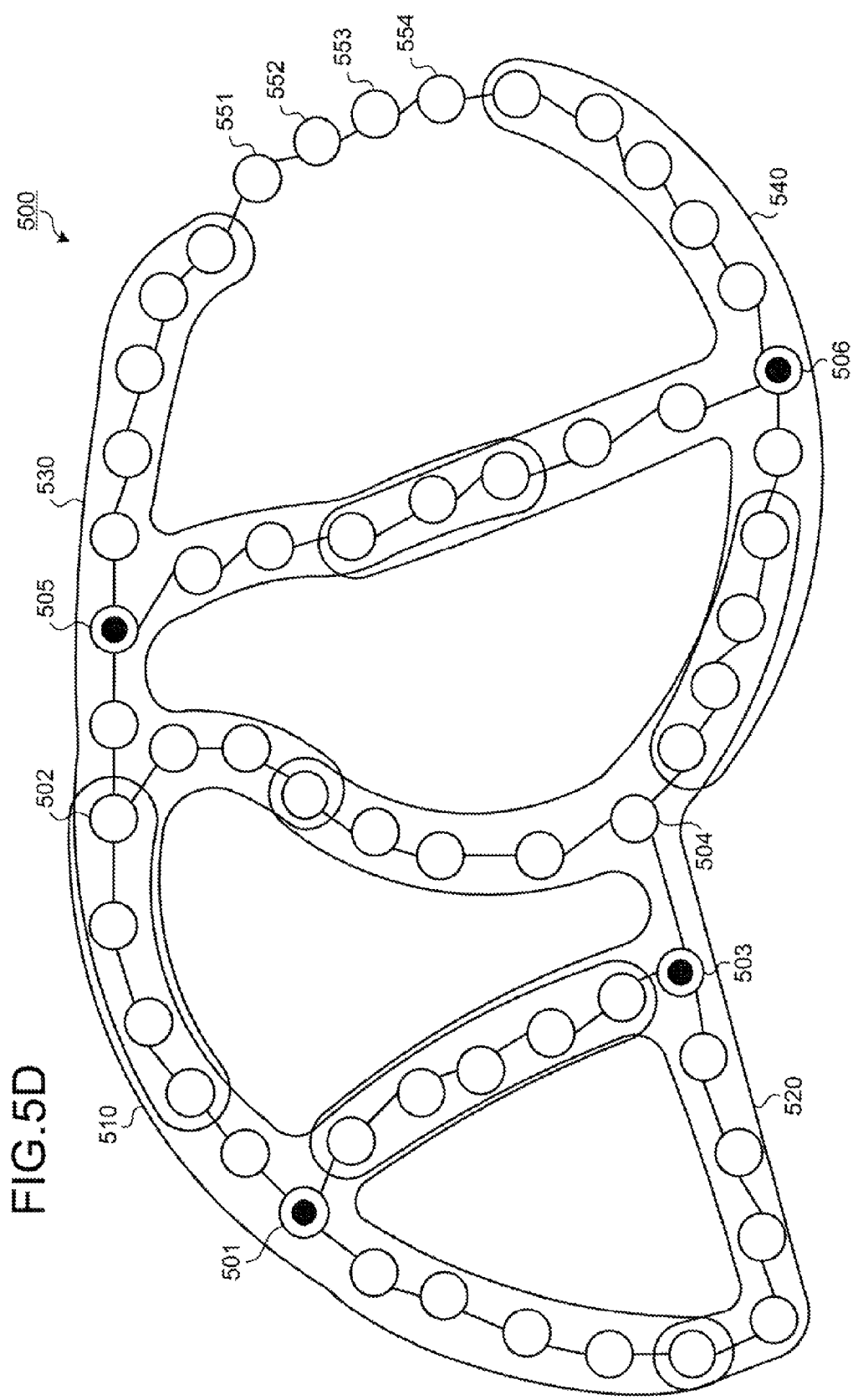

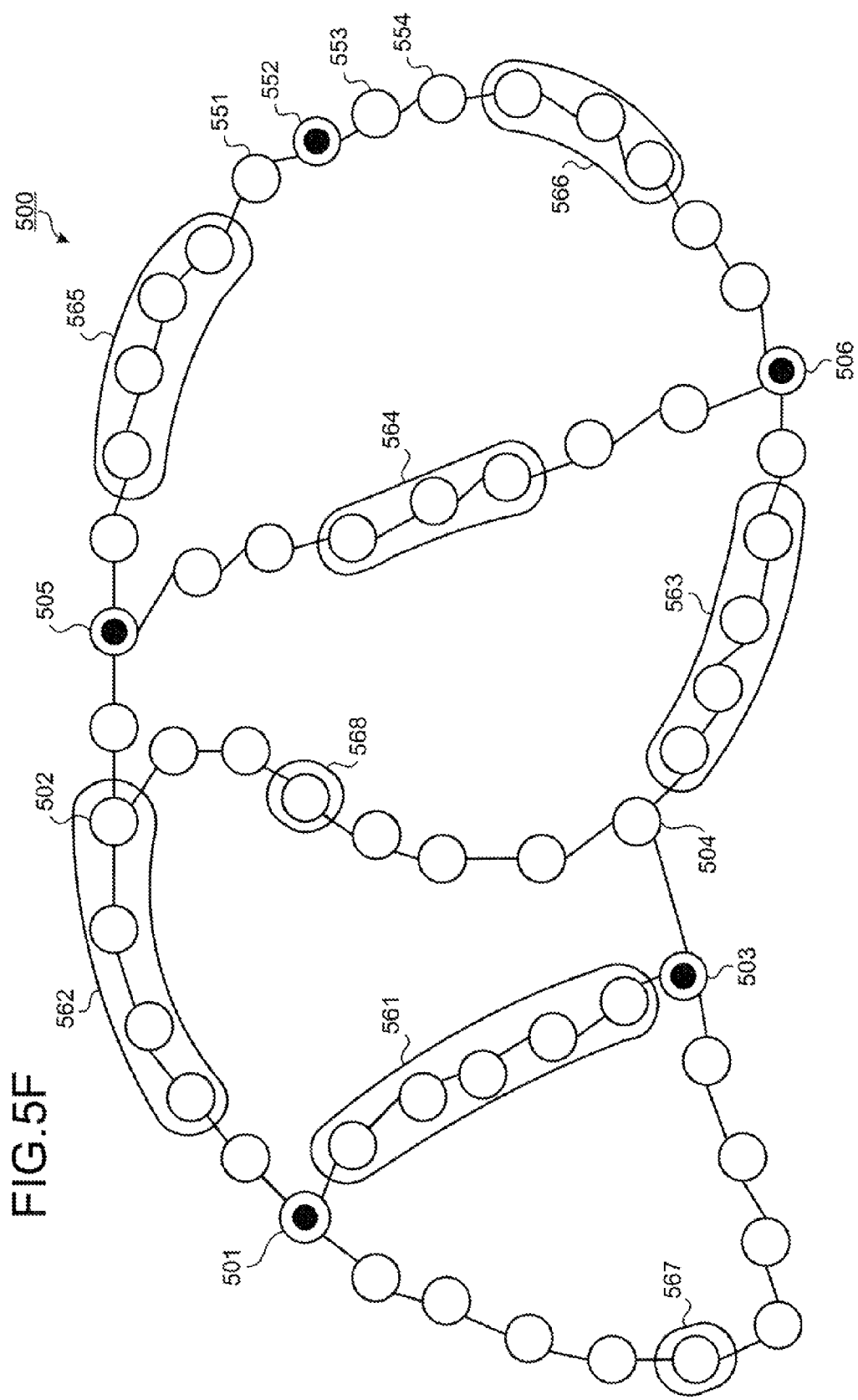

|  | AMOUNT OF DISPERSION |
|---|---|
| Span[0-1] | 50 |
| Span[1-2] | 50 |
| Span[2-3] | 50 |
| Span[3-4] | 50 |
| Span[4-5] | 50 |
| Span[5-0] | 50 |
| Span[0-6] | 50 |
| Span[3-7] | 50 |

| SPAN COUNT | 0 | 1 | 2 | 3 | 4 | 5 |
|---|---|---|---|---|---|---|
| ToleranceUpper | 105 | 100 | 95 | 90 | 85 | 80 |
| ToleranceLower | -5 | 0 | 5 | 10 | 15 | 20 |

| 1200 | | AMOUNT OF DISPERSION | DCM | 1210 | 1220 DCM |
|---|---|---|---|---|---|
| SEGMENT "1" | Span[0-1] | 50 | -45 | SEGMENT "2" | -45 |
| SEGMENT "1" | Span[1-2] | 50 | -35 | SEGMENT "2" | -35 |
| SEGMENT "1" | Span[2-3] | 50 | -45 | SEGMENT "2" | -45 |
| SEGMENT "1" | Span[3-4] | 50 | -35 | SEGMENT "2" | -35 |
| SEGMENT "1" | Span[4-5] | 50 | -45 | SEGMENT "2" | -45 |
| SEGMENT "1" | Span[5-0] | 50 | -35 | SEGMENT "2" | -35 |
| SEGMENT "1" | Span[0-6] | 50 | -35 | | |
| | Span[3-7] | 50 | | SEGMENT "2" | -35 |

FIG.13

| | | | AMOUNT OF DISPERSION | DCM |
|---|---|---|---|---|
| SEGMENT "1" | SEGMENT "2" | Span[0-1] | 50 | -45 |
| SEGMENT "1" | SEGMENT "2" | Span[1-2] | 50 | -35 |
| SEGMENT "1" | SEGMENT "2" | Span[2-3] | 50 | -45 |
| SEGMENT "1" | SEGMENT "2" | Span[3-4] | 50 | -35 |
| SEGMENT "1" | SEGMENT "2" | Span[4-5] | 50 | -45 |
| SEGMENT "1" | SEGMENT "2" | Span[5-0] | 50 | -35 |
| SEGMENT "1" | | Span[0-6] | 50 | -35 |
| | SEGMENT "2" | Span[3-7] | 50 | -35 |

…

NETWORK DESIGN APPARATUS, METHOD, AND COMPUTER PRODUCT

CROSS REFERENCE TO RELATED APPLICATIONS

This application is based upon and claims the benefit of priority of the prior Japanese Patent Application No. 2009-194103, filed on Aug. 25, 2009, the entire contents of which are incorporated herein by reference.

FIELD

The embodiments discussed herein are related to a network design apparatus.

BACKGROUND

In the field of the optical networks, an optical add-drop multiplexer (OADM) that adds or drops optical signals of a given wavelength, or a wavelength cross connect (WXC) which is also called an optical hub has come into practical use, resulting in optical networks having a complicated topology such as an interconnection of rings and a mesh. There is a growing need for optimized design, for example, optical transmission design and device layout, in such a complicated network (see for example, International Publication Pamphlet No. 2005/006604 and Japanese Laid-Open Patent Publication No. 2005-166698).

For example, a wavelength dispersion compensation design technique of designing the layout of dispersion compensation modules (DCM) is known. According to the wavelength dispersion compensation design technique, for instance, nodes (sites) in an optical network are grouped into segments, and transmission through any path (for example, a wavelength path) that connects two nodes in a segment is possible.

However, according to the technique above, for instance, with regard to paths that bridge segments, a path having fewer spans than a path capable of transmission may become incapable of transmission, resulting in an a strange design. Such a design is difficult for a user to understand and the user does not easily accept the design.

SUMMARY

According to an aspect of an embodiment, a network design apparatus includes an input unit configured to receive network information that indicates nodes connected by optical transmission paths and path information that indicates paths between the nodes; an design unit configured to perform, based on the network information and the path information, wavelength dispersion compensation design using a constraint condition that a path whose span count is larger than a span count of another path that does not satisfy a transmission condition does not satisfy the transmission condition; and an output unit configured to output a result obtained by the design unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a flowchart of operation of the network design apparatus depicted in FIG. 1.

FIGS. 5A to 5F are diagrams depicting an example of design according to the flowchart of FIG. 4.

FIG. 13 is a diagram depicting one exemplary result of design by a second design unit.

DESCRIPTION OF EMBODIMENTS

Preferred embodiments of the present invention will be explained with reference to the accompanying drawings.

Figure 1:
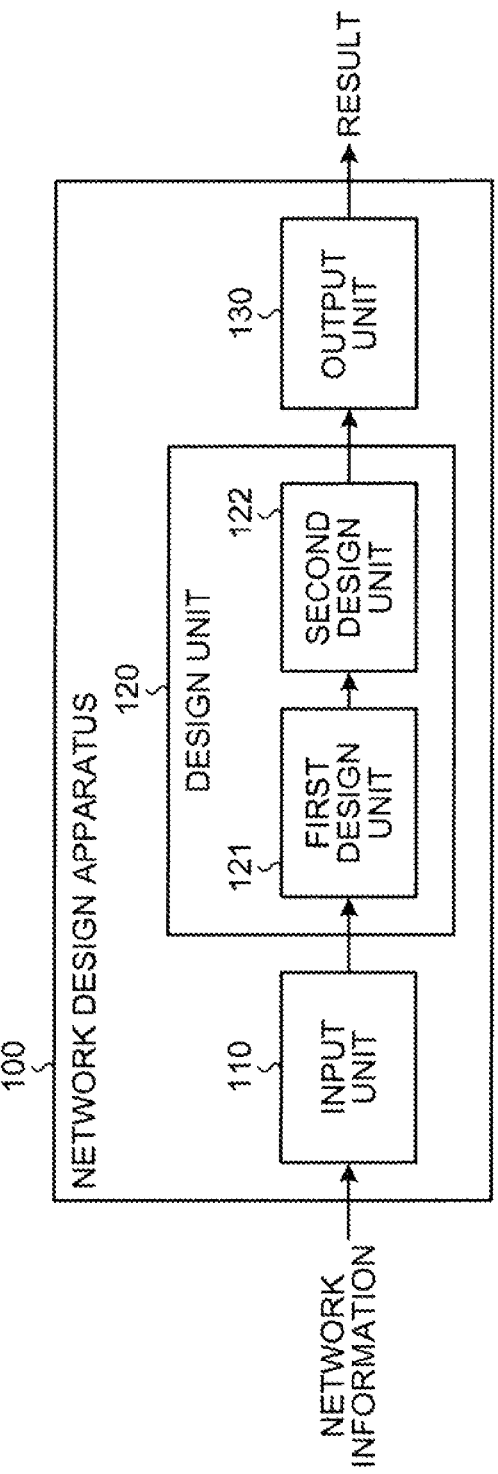
FIG. 1 is a block diagram depicting a network design apparatus according to an embodiment.

FIG. 1 is a block diagram depicting a network design apparatus according to an embodiment. A network design apparatus 100 performs wavelength dispersion compensation design for a network. As depicted in FIG. 1, the network design apparatus 100 includes an input unit 110, a design unit 120, and an output unit 130. The input unit 110 receives network information that indicates nodes connected by optical transmission paths, and path information that indicates paths (demands) between nodes.

A node is a site where a communication apparatus such as an OADM or WXC is placed. A path is a route that connects nodes. For instance, if the network 200 is a wavelength division multiplexing (WDM) network, the path is a wavelength path of the WDM. The input unit 110 outputs the network information and the path information to the design unit 120.

The design unit 120 performs wavelength dispersion compensation design for each node, using given conditions, based on the network information and the path information. Wavelength dispersion compensation design is, for example, the designing of a combination of DCMs applied to spans between nodes. The design unit 120 performs wavelength dispersion compensation design, for example, according to linear programming. In this way, wavelength dispersion compensation design satisfying a transmission condition and a constraint condition is efficiently performed. More specifically, the design unit 120 includes a first design unit 121 and a second design unit 122.

The first design unit 121 groups the nodes indicated by the network information into segments that have overlap. The first design unit 121 performs the grouping so that a wavelength dispersion compensation design exists where paths in a segment satisfy the transmission condition.

The first design unit 121 obtains a wavelength compensation design resulting from the determination of the segments. Therefore, the result obtained by the first design unit 121 is a design in which the paths in the segments each satisfy the transmission condition. The first design unit 121 outputs the network information, the path information, and the result to the second design unit 122. The first design unit 121 also outputs the overlaps between segments to the second design unit 122.

The second design unit 122 performs wavelength dispersion compensation design for the overlaps, using a given constraint. The given constraint is that a path having a larger span count (the number of spans) than a path that does not satisfy the transmission condition does not satisfy the transmission condition. The second design unit 122 outputs to the output unit 130, the result of the wavelength dispersion compensation design for the overlaps.

The output unit 130 outputs the result output from the second design unit 122. The result output from the output unit 130 is, for example, a combination of DCMs applied to each span between nodes indicated by the network information. According to the result, a user places a DCM at a terminal node of a span, thereby constructing a network satisfying the transmission condition and the constraint condition.

The input unit 110 is implemented by, for example, a user interface such as a keyboard and a mouse or by a communication interface to an external storage device storing the network information or the path information. The design unit 120 is implemented by, for example, an arithmetic device such as a digital signal processor (DSP). The output unit 130 is implemented by, for example, a user interface such as a display or a communication interface to an external storage device storing results of the design or to a printer.

The network design apparatus 100 has a memory. The input unit 110 stores the network information or the path information to the memory of the network design apparatus 100. The design unit 120 reads out the network information or the path information stored to the memory and performs wavelength dispersion compensation design based on the network information or the path information. The design unit 120 stores the result of the design to the memory of the network design apparatus 100. The output unit 130 reads out and outputs the result.

Figure 2:
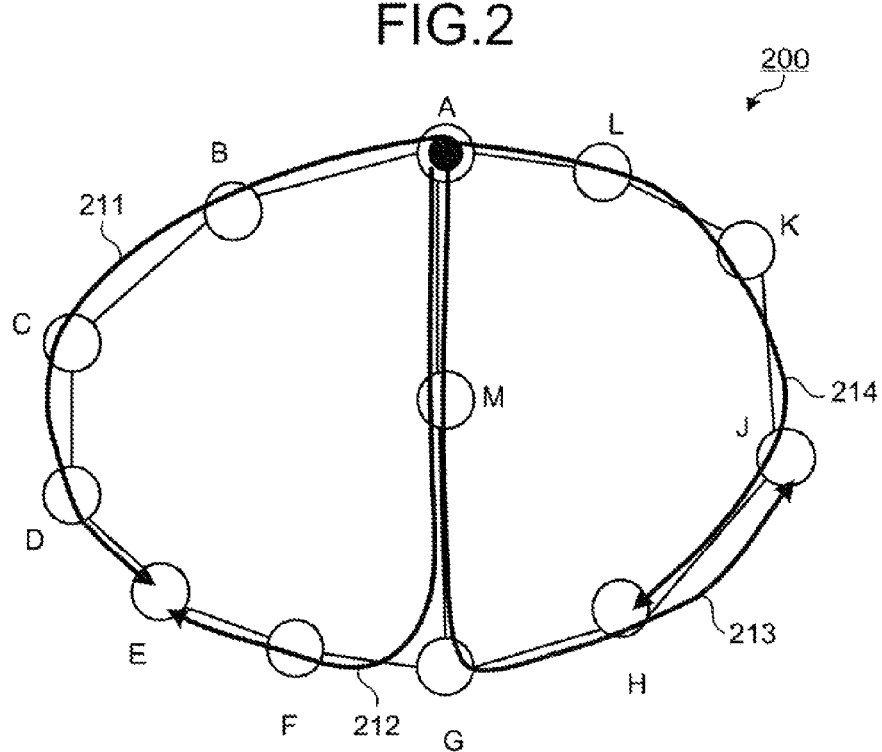
FIGS. 2 and 3 are diagrams depicting examples of network design.

FIG. 2 is a diagram depicting an example of network design. It is assumed here that network information input from the input unit 110 indicates a network 200 that includes nodes A through M. In the network 200, nodes A through L form a ring and nodes A, M, and G are connected in series. In this example, node A and node G are hub nodes that are connected to three or more nodes. The first design unit 121 groups nodes A through M into segments having paths that each satisfies the transmission condition.

For example, the first design unit 121 selects a hub node from among nodes A through M. It is assumed here that node A has been chosen from among hub nodes A and G. The first design unit 121 temporarily groups nodes that are within a span count of N (N=1, 2, 3, . . . ) from node A into a segment. The first design unit 121 increments the number N of nodes from 1, 2, 3, . . . as far as the wavelength dispersion compensation design in which each path in the segment satisfies the transmission condition exists, and determines the segment so that N is maximized.

It is assumed here that a segment centered around node A has a span count of 4 (N=4). The segment centered around node A includes a route 211 made up of nodes A through E, a route 212 made up of nodes A, M, G, F, and E, a route 213 made up of nodes A, M, G, H, and J, and a route 214 made up of nodes A, L, K, J, and H. In this example, the segment centered around node A includes all nodes A through M and thus a result is obtained in which all paths among the nodes are capable of transmission.

The result of the first design unit 121 is output to the second design unit 122. Since all paths among the nodes are capable of transmission in this example, the second design unit 122 need not perform the wavelength dispersion compensation design again. The result of the first design unit 121 is output from the output unit 130.

Figure 3:
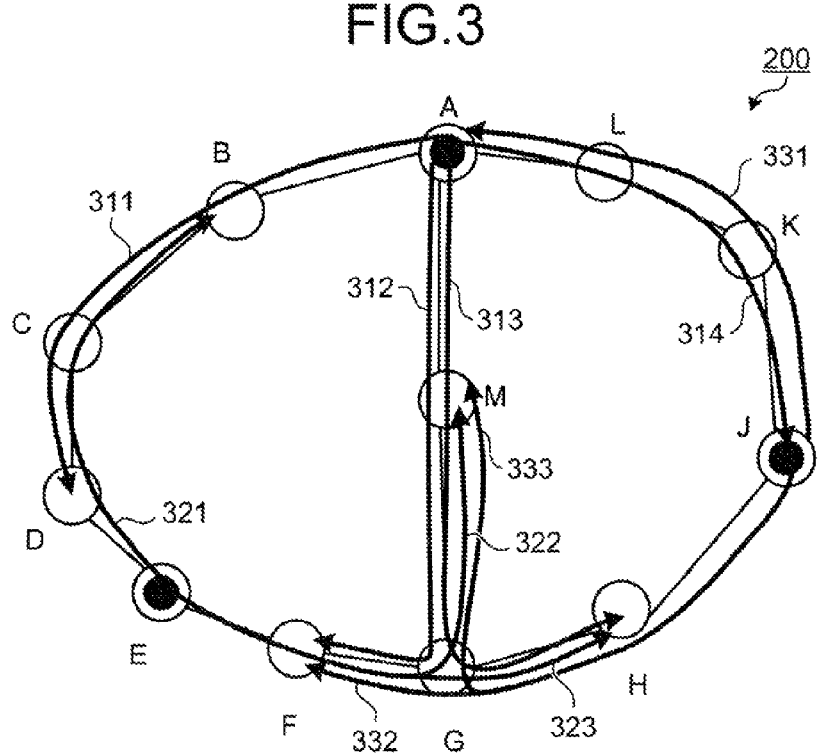

FIG. 3 is a diagram depicting an example of network design. As depicted in FIG. 3, it is assumed that in the network 200, a segment centered around node A has a span count of 3 (N=3). The segment around node A includes a route 311 made up of nodes A through D, a route 312 made up of nodes A, M, G, and F, a route 313 made up of nodes A, M, G, and H, and a route 314 made up of nodes A, L, K, and J.

The segment centered around node A does not include node E. In this case, the first design unit 121 determines a segment centered around node E. It is assumed that the segment centered around node E has a span count of 3 (N=3). The segment centered around node E includes a route 321 made up of nodes E, D, C, and B, a route 322 made up of nodes E, F, G, and M, and a route 323 made up of nodes E, F, G, and H.

The segments centered around nodes A and E respectively do not include a span between node J and node H. In this case, a segment centered around node J is determined. It is assumed here that the segment centered around node J has a span count of 3 (N=3). The segment centered around node J includes a route 331 made up of nodes J, K, L, and A, a route 332 made up of nodes J, H, G, and F, and a route 333 made up of nodes J, H, G, and M.

Thus, if not all paths in one segment (the segment centered around node A) are capable of transmission, the first design unit 121 groups nodes A through M in the network 200 into multiple segments having overlaps. The first design unit 121 ensures that paths within each segment satisfy the transmission condition.

The result of design by the first design unit 121 is output to the second design unit 122. The second design unit 122 performs wavelength dispersion compensation design again for the overlaps of the segments. The wavelength dispersion compensation design by the second design unit 122 will be explained later.

FIG. 4 is a flowchart of operation of the network design apparatus depicted in FIG. 1. The network design apparatus 100 depicted in FIG. 1 performs, for example, the operations below when the network information and the path information are input from the input unit 110. It is determined whether hub nodes belonging to none of the segments are present among hub nodes of nodes indicated by the network information (step S401).

If there are hub nodes that are not included in a segment at step S401 (step S401: YES), one of the hub nodes is selected (step S402). A segment centered around the hub node selected at step S402 is determined (step S403), the process returns to step S401.

If all hub nodes belong to a segment at step S401 (step S401: NO), it is determined whether there are nodes that are not included in a segment (step S404). If there are nodes that are not included in a segment (step S404: YES), one of the nodes is selected (step S405).

A segment centered around the node selected at step S405 is determined (step S406), and the process returns to step S404. Steps S401 through S406 are performed by, for example, the first design unit 121 of FIG. 1. After steps S401 through S406, the nodes indicated by the network information are grouped into multiple segments.

If all nodes belong to a segment at step S404 (step S404: NO), it is determined whether there are overlaps for which processing (processing corresponding to operations at steps S408 and S409) has not been finished (step S407). If there are such overlaps (step S407: YES), one of the overlaps is selected (step S408).

The wavelength dispersion compensation design is conducted for the overlap selected at step S408 (step S409), and the process returns to step S407. A constraint is placed on the wavelength dispersion compensation design at step S409, the constraint being that a path having a larger span count than a path that does not satisfy the transmission condition is considered not to satisfy the transmission condition. Steps S407 through S409 are performed by, for example, the second design unit 122 of FIG. 1.

If all overlaps have been processed (step S407: NO), results of steps S403, S406, and S409 are output from the output unit 130 (step S410), and a series of the operations ends. Through the operations explained above, design results for a network indicated by network information can be obtained.

FIG. 5A is a diagram depicting an example of design according to the flowchart of FIG. 4. A network 500 is a network indicated by the network information input via the input unit 110. Nodes in the network 500 include hub nodes 501 through 506. It is assumed here that a hub node 501 is selected at step S402 of FIG. 4.

At step S403 of FIG. 4, a maximum value of a span count N (N=1, 2, 3, . . . ) is calculated such that paths having a span count of N or less from the hub node 501 satisfy the transmission condition for wavelength dispersion. Nodes within the maximum span count from the hub node 501 are determined as a segment centered around the hub node 501. The determination of whether the transmission condition is satisfied is judged from whether there is a combination of DCMs for spans that satisfy the transmission condition.

It is assumed here that paths having a span count of ≤5 from the hub node 501 satisfy the transmission condition and at least one path having a span count of 6 from the hub node 501 does not satisfy the transmission condition. In this case, nodes within a span count of ≤5 from the hub node 501 are determined as a segment 510.

At step S402 at the second iteration, one of the hub nodes (hub nodes 503 through 506) that are not included in the segment 510 is selected. A hub node whose span count (for example, smallest span count) from the segment 510 is least among the hub nodes 503 through 506 may be selected.

The smallest span count for each of the hub nodes 503 through 506 from the segment 510 are 1, 2, 2, and 8, respectively. Therefore, the hub node 503, whose smallest span count from the segment 510 is the least, is selected. At step S403 of FIG. 4, nodes within a certain range from the hub node 503 are determined as a segment (see FIG. 5B).

Figure 5B:
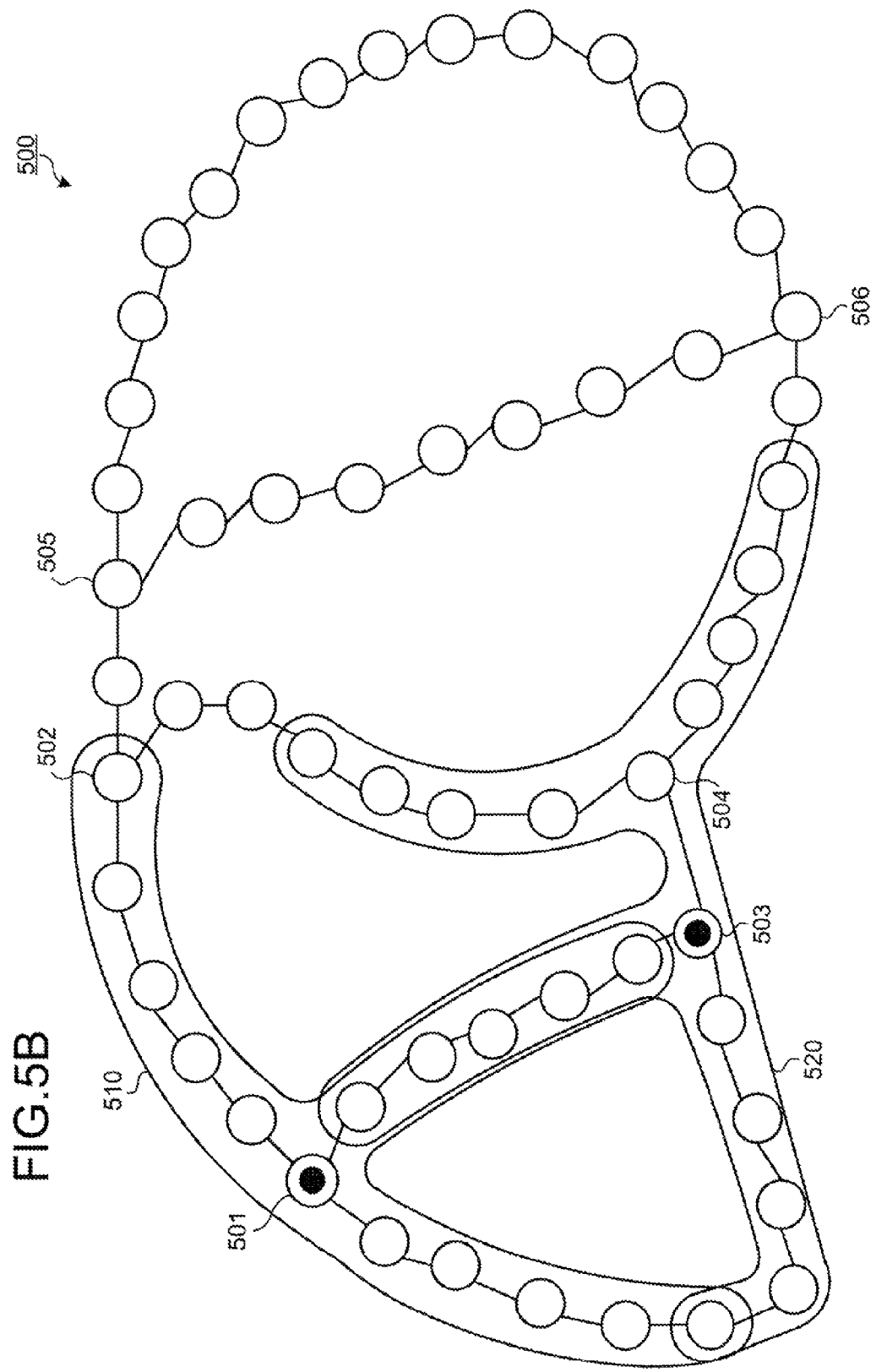

FIG. 5B is a diagram depicting an example of the design according to the flowchart of FIG. 4. At step S403 at the second iteration, a maximum value of a span count N (N=1, 2, 3, . . . ) is calculated such that paths having the span count N or less from the hub node 503 satisfy the transmission condition for wavelength dispersion. Nodes within the maximum span count from the hub node 503 are determined as a segment centered around the hub node 503.

It is assumed here that paths of a span count of ≤5 from the hub node 503 satisfy the transmission condition and at least one path having a span count of 6 from the hub node 503 does not satisfy the transmission condition. In this case, nodes within a span count of ≤5 from the hub node 503 are determined as a segment 520.

At step S402 at the third iteration, one of the hub nodes (hub nodes 505 and 506) that are not included in the segments 510 and 520 is selected. The smallest span count from the hub node 505 to the segments 510 and 520 is two and the smallest span count from the hub node 506 to the segments 510 and 520 is also two. Thus, either hub node 505 or 506 can be selected. It is assumed here that the hub node 505 has been selected. At step S403 of FIG. 4, nodes within a certain range from the hub node 505 are determined as a segment (see FIG. 5C).

Figure 5C:
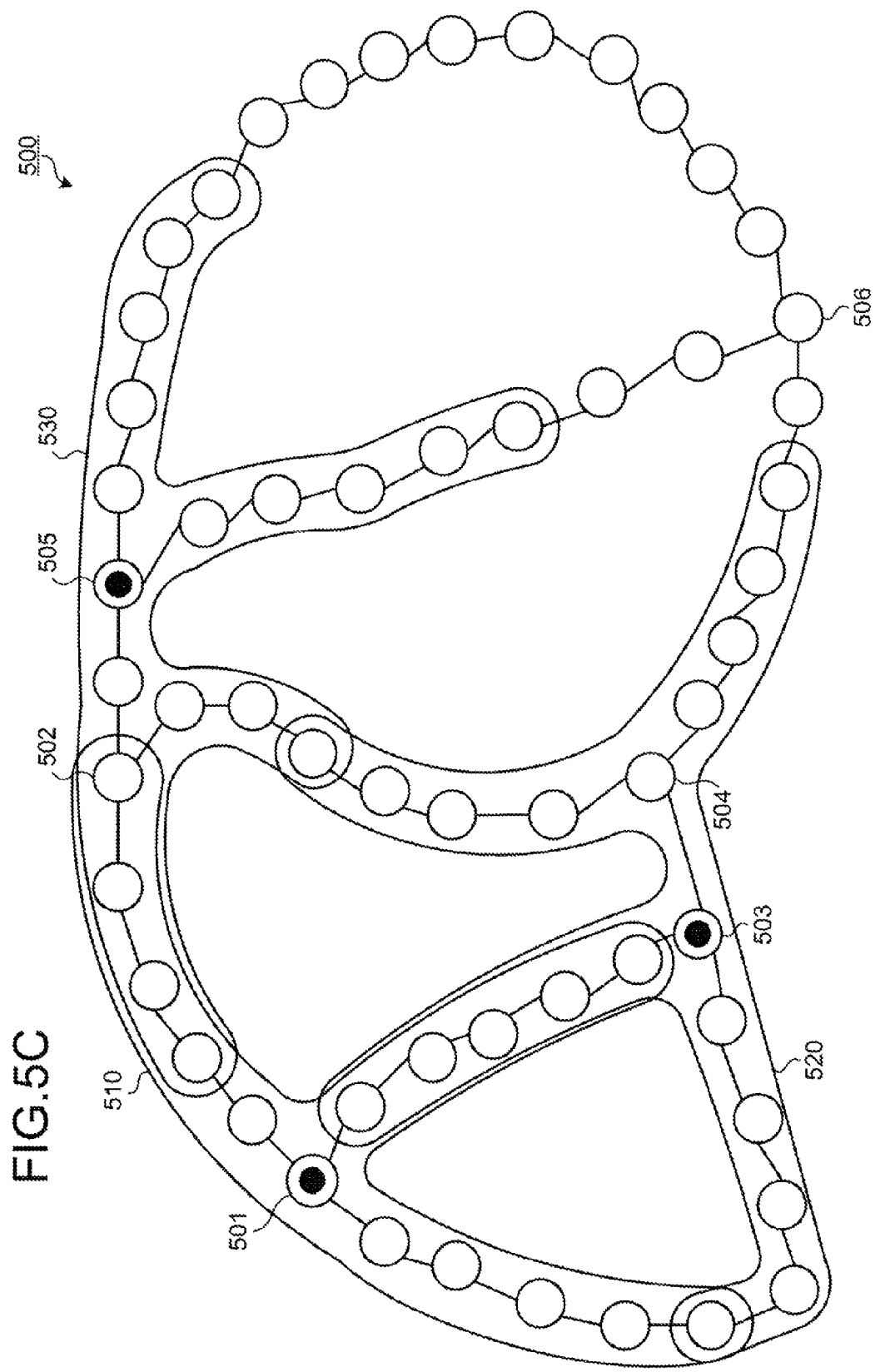

FIG. 5C is a diagram depicting an example of the design according to the flowchart of FIG. 4. At step S403 at the third iteration, a maximum value of a span count N (N=1, 2, 3, . . . ) is calculated such that paths having the span count N or less from the hub node 505 satisfy the transmission condition for wavelength dispersion. Nodes within the maximum span count from the hub node 505 are determined as a segment centered around the hub node 505.

It is assumed here that paths of a span count of ≤5 from the hub node 505 satisfy the transmission condition and at least one path of a span count of 6 from the hub node 505 does not satisfy the transmission condition. In this case, nodes within a span count of ≤5 from the hub node 505 are determined as a segment 530.

At step S402 at the fourth iteration, a hub node (hub node 506) that is not included in the segments 510, 520, and 530 is selected. At step S403, nodes within a certain range from the hub node 506 are determined as a segment (see FIG. 5D).

FIG. 5D is a diagram depicting an example of the design according to the flowchart of FIG. 4. At step S403 at the fourth iteration, a maximum value of a span count N (N=1, 2, 3, . . . ) is calculated such that paths having the span count N or less from the hub node 506 satisfy the transmission condition for wavelength dispersion. Nodes within the maximum span count from the hub node 506 are determined as a segment centered around the hub node 506.

It is assumed here that paths of a span count of ≤5 from the hub node 506 satisfy the transmission condition and at least one path of a span count of 6 from the hub node 506 does not satisfy the transmission condition. In this case, nodes within a span count of ≤5 from the hub node 506 are determined as a segment 540.

As a result, every hub node belongs to at least one of the segments 510, 520, 530, and 540. At step S405 of FIG. 4, one of nodes (nodes 551 through 554) that are not included in the segments 510, 520, 530, and 540 is selected. A node whose span count (for example, smallest span count) from the segments 510, 520, 530, and 540 is greatest among nodes 551 through 554 may be selected.

The smallest span counts of each of the nodes 551 through 554 from the segments 510, 520, 530, and 540 are 1, 2, 2, 1, respectively. Therefore, either node 552 or 553 whose smallest span count is greatest can be selected. It is assumed here that the node 552 has been selected. At step S406 of FIG. 4, nodes within a certain range from the node 552 are determined as a segment (see FIG. 5E).

Figure 5E:
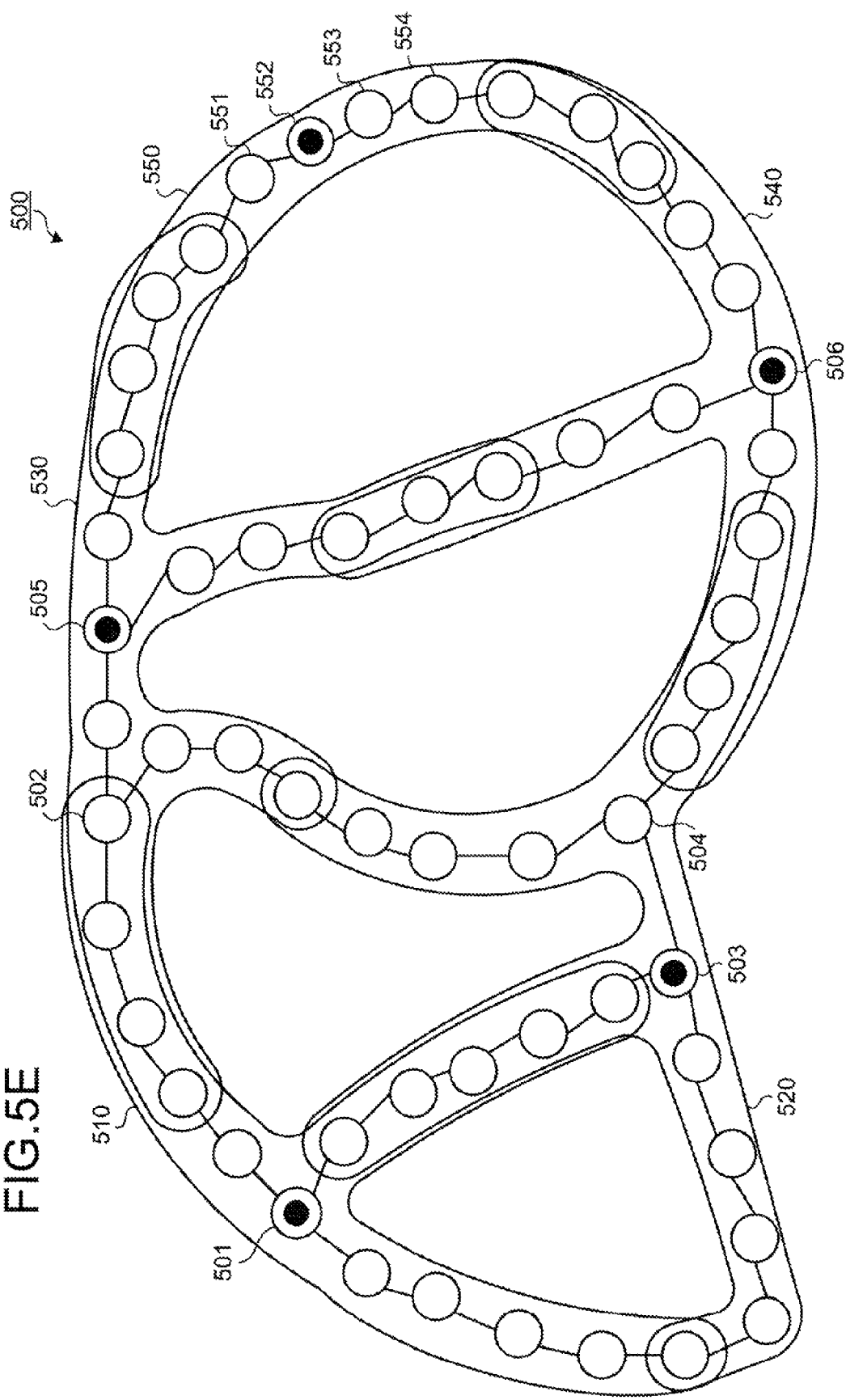

FIG. 5E is a diagram depicting an example of the design according to the flowchart of FIG. 4. At step S406 of FIG. 4, a maximum value of a span count N (N=1, 2, 3, . . . ) is calculated such that paths having the span count N or less from the node 552 satisfy the transmission condition for wavelength dispersion. Nodes within the maximum span count from the node 552 are determined as a segment centered around the hub node 552.

It is assumed here that paths of a span count of ≤5 from the node 552 satisfy the transmission condition and at least one path of a span count of 6 from the node 552 does not satisfy the transmission condition. In this case, nodes within a span count ≤5 from the node 552 are determined as a segment 550. As a result, all nodes belong to at least one of the segments 510, 520, 530, 540, and 550. At step S409 of FIG. 4, the wavelength dispersion compensation design for overlaps among the segments 510, 520, 530, 540, and 550 is performed (see FIG. 5F).

FIG. 5F is a diagram depicting an example of the design according to the flowchart of FIG. 4. FIG. 5F depicts overlaps 561 through 566 of segments and boundaries 567 and 568. The overlap 561 is an overlap of the segments 510 and 520. The overlap 562 is an overlap of the segments 510 and 530. The overlap 563 is an overlap of the segments 520 and 540. The overlap 564 is an overlap of the segments 530 and 540. The overlap 565 is an overlap of the segments 530 and 550. The overlap 566 is an overlap of the segments 540 and 550. The boundary 567 is a boundary of the segments 510 and 520. The boundary 568 is a boundary of the segments 520 and 530.

At step S408 of FIG. 4, the overlaps 561 through 566 are selected one by one. At step S409, the wavelength dispersion compensation design is performed for the selected overlap. At step S409, the wavelength dispersion compensation design is performed using the constraint that a path having a larger span count than a path that does not satisfy the transmission condition does not satisfy the transmission condition. For example, with respect to the overlap 561, a combination of DCMs for the five nodes included in the overlap 561 is selected again so that the constraint condition is satisfied.

Figure 6A:
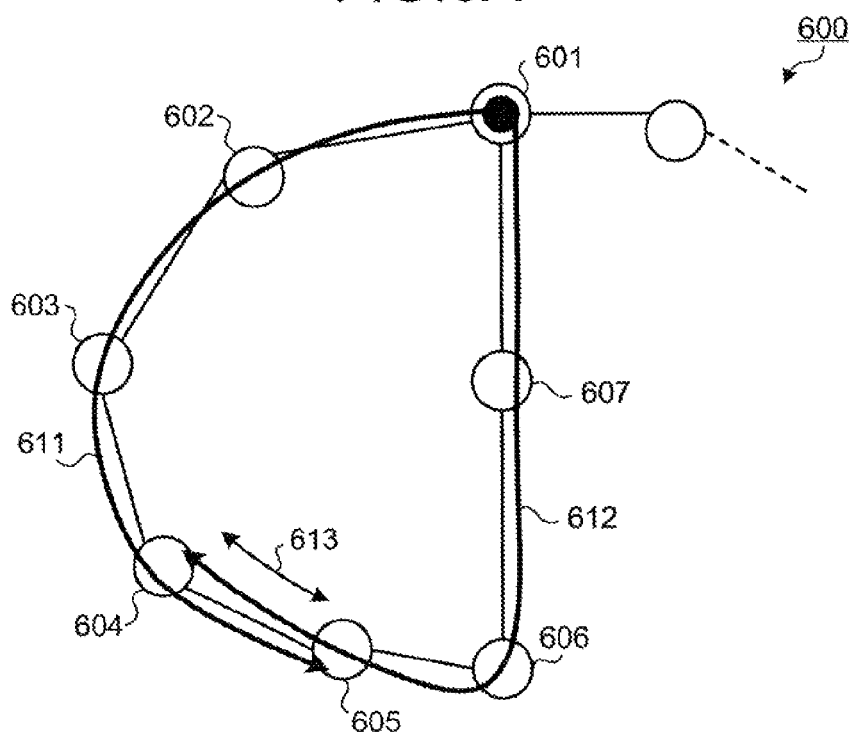
FIGS. 6A and 6B are diagram depicting processing for overlap within a segment.
Figure 6B:
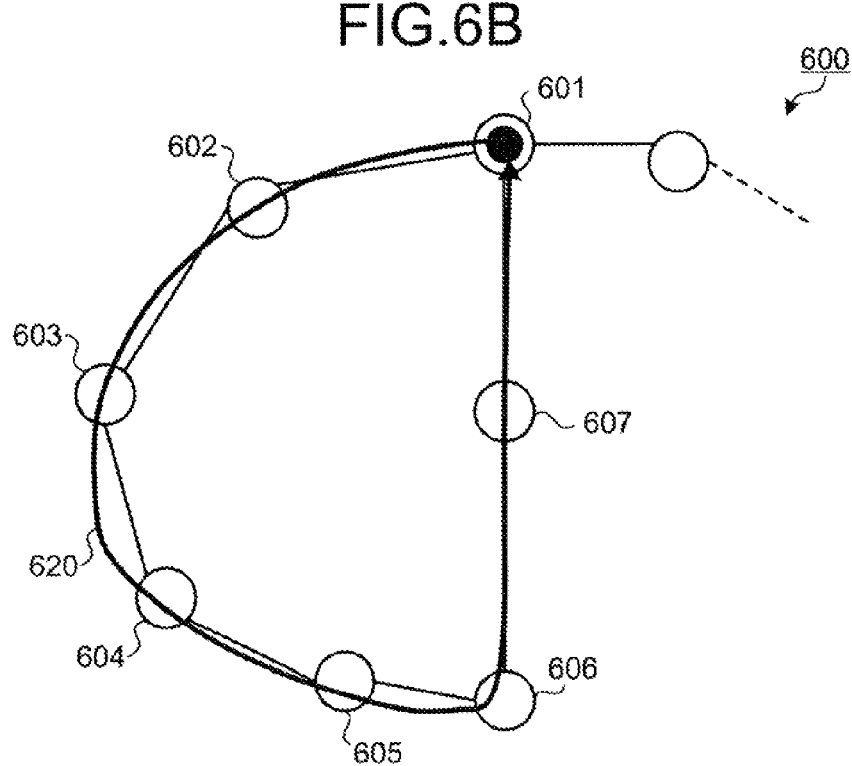

FIG. 6A is a diagram depicting processing for overlap within a segment. FIG. 6B is a diagram also depicting processing for overlap within a segment. It is assumed here that in a network 600 depicted in FIG. 6A, the first design unit 121 determines that nodes of a span count of ≤4 from a hub node 601 form one segment.

In this case, within the segment centered around the hub node 601, a route 611 including the hub node 601 and nodes 602 through 605 and a route 612 including the hub node 601 and nodes 604 through 607 form an overlap 613. If overlap occurs within one segment, the first design unit 121 integrates the routes 611 and 612 to be one network as a route 620 in FIG. 6B and performs wavelength dispersion compensation design.

Figure 7A:
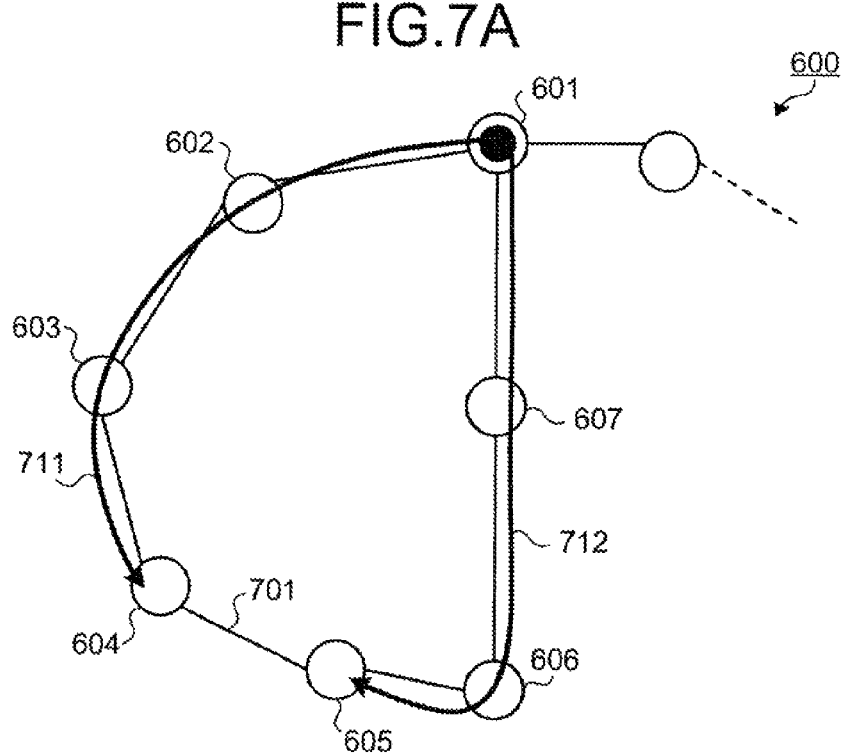
FIGS. 7A and 7B are diagrams depicting processing for unfinished span design.
Figure 7B:
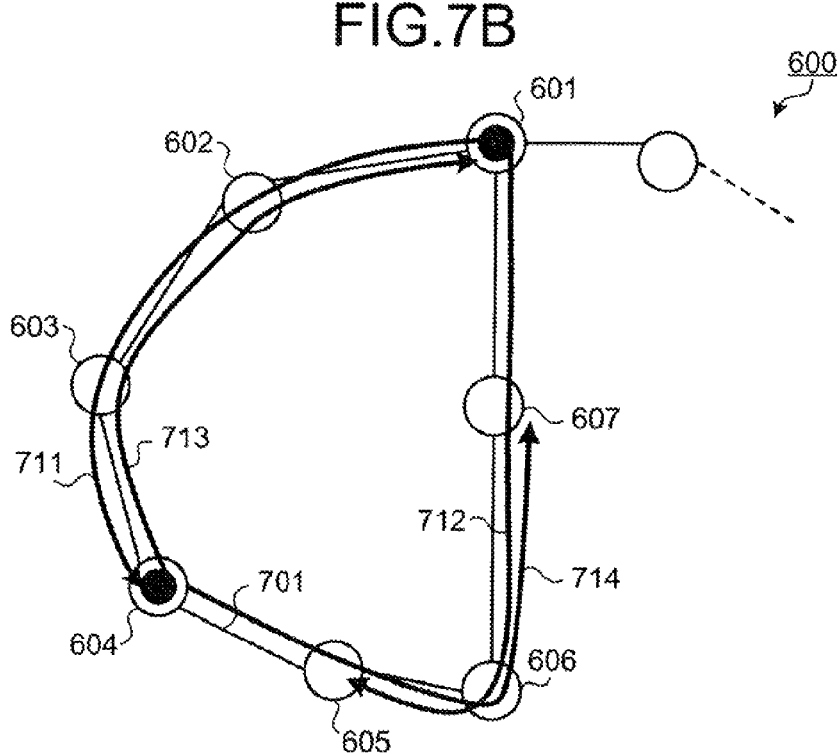

FIG. 7A is a diagram depicting processing for unfinished span design. FIG. 7B is a diagram also depicting processing for unfinished span design. In FIG. 7A and FIG. 7B, parts identical to those in FIG. 6A and FIG. 6B are given identical reference numerals and the explanation thereof will be omitted.

It is assumed here that for the network 600 depicted in FIG. 7A, the first design unit 121 determines that nodes of a span count of ≤3 from the hub node 601 form one segment. In this case, the wavelength dispersion compensation design is performed for a route 711 including the hub node 601 and the nodes 602 through 604 and a route 712 including the hub node 601 and the nodes 605 through 607. With respect to a span 701 between the nodes 604 and 605, since the span 701 is not included in the segment, the wavelength dispersion compensation design is not performed for the span 701.

The first design unit 121, as depicted in FIG. 7B, selects either node 604 or node 605. It is assumed here that the first design unit 121 selects the node 604 and determines a segment centered around the node 604. The first design unit 121 determines that nodes within a span count of ≤3 from the node 604 form one segment. The wavelength dispersion compensation designing is performed for a route 713 that includes nodes 601 through 604 and a route 714 that includes nodes 604 through 607.

The first design unit 121 ensures that paths in the segment centered around the node 604 satisfy the transmission condition for wavelength dispersion. As in this case, when there is a span that is not included in a segment, one of the nodes located at the ends of the span that does not belong to the segment is selected, and a new segment centered around the selected node is formed. As a result, the wavelength dispersion of all spans is taken into consideration in the wavelength dispersion compensation design.

At step S403 and S406 of FIG. 4, the first design unit 121 determines a segment according to the linear programming where combinations of DCMs for spans between nodes are variables, Equation (1) below is an objective function, and Equations (2) through (5) below are constraints.

$$\text{Minimize:} \sum_{k=1}^{SpanNo} S[k] \quad (1)$$

$$\sum_{l=1}^{N[k]} y[k][l] \neq N[k] \Rightarrow S[k] = 1 \quad (2)$$

$$y_{low}[k][l] = 1 \text{ or } y_{up}[k][l] = 1 \Rightarrow y[k][l] = 1 \quad (3)$$

$$\left\{ \begin{array}{l} RD\begin{bmatrix} d, \lambda_1, \\ DCM \end{bmatrix} - devLower\begin{bmatrix} d, \lambda_1, \\ DCM \end{bmatrix} < LowerTolerance[d, \lambda_1] \\ \text{or} \\ \vdots \\ \text{or} \\ RD\begin{bmatrix} d, \lambda_n, \\ DCM \end{bmatrix} - devLower\begin{bmatrix} d, \lambda_n, \\ DCM \end{bmatrix} < LowerTolerance[d, \lambda_n] \end{array} \right\} \Rightarrow \quad (4)$$

$$y_{up}[k][1] = 1$$

$$\left\{ \begin{array}{l} RD\begin{bmatrix} d, \lambda_1, \\ DCM \end{bmatrix} > UpperTolerance\begin{bmatrix} d, \lambda_1, \\ DCM \end{bmatrix} - devUpper[d, \lambda_1] \\ \text{or} \\ \vdots \\ \text{or} \\ RD\begin{bmatrix} d, \lambda_n, \\ DCM \end{bmatrix} > UpperTolerance\begin{bmatrix} d, \lambda_n, \\ DCM \end{bmatrix} - devUpper[d, \lambda_n] \end{array} \right\} \Rightarrow \quad (5)$$

$$y_{low}[k][1] = 1$$

In Equation (1), S[k] is an identifier that indicates whether all paths whose span count is k are capable of transmission (satisfy the transmission condition). S[k]=0 indicates capable of transmission. S[k]=1 indicates incapable of transmission. SpanNo denotes the current span count. In the embodiments above, SpanNo=N. Equation (1) expresses maximization of the number of span counts for which all paths are capable of transmission, the span counts being among span counts of (SpanNo). When the objective function becomes 0 (zero), all paths having a span count of are capable of transmission.

In Equation (2), y[k][l] is an identifier that indicates whether the l-th pass of span count k is capable of transmission. y[k][l]=0 indicates capable of transmission. y[k][l]=1 indicates incapable of transmission. MSM is the maximum value of the span count N and is determined in light of Optical Signal-to-Noise Ratio (OSNR). N[k] denotes the number of paths whose span count is k. Equation (2) represents a constraint condition where if at least one of the paths whose span count is k is incapable of transmission, S[k]=1.

Equations (3) through (5) represent a model for the wavelength dispersion compensation design. In Equations (3) through (5), $y_{up}[k][l]$ is an identifier that indicates whether an upper limit of residual dispersion of the l-th path whose span count is k is within a dispersion tolerance. $y_{up}[k][l]=0$ indicates that the upper limit is within the dispersion tolerance. $y_{up}[k][l]=1$ indicates that the upper limit is outside the dispersion tolerance.

$y_{low}[k][l]$ is an identifier that indicates a lower limit of residual dispersion of the l-th path whose span count is k is within dispersion tolerance. $y_{low}[k][l]=0$ indicates that the lower limit is within the dispersion tolerance. $y_{low}[k][l]=1$ indicates that the lower limit is outside the dispersion tolerance. Equation (3) represents a constraint condition where if at least one among the upper limit and the lower limit is outside the dispersion tolerance, the l-th path whose span count k is incapable of transmission.

In Equations (4) and (5), $RD[d, \lambda_n, DCM]$ denotes a residual dispersion value when a DCM is chosen for a wavelength path $\lambda_n$ of a demand d. $devLower[d, \lambda_n, DCM]$ denotes a lower limit of a difference between a specification value and a design value when a DCM is selected for a wavelength path $\lambda_n$ of a demand d.

$LowerTolerance[d, \lambda_n]$ denotes a lower limit of dispersion tolerance at a wavelength path $\lambda_n$ of a demand d. $devUpper[d, \lambda_n, DCM]$ denotes an upper limit of a difference between a specification value and a design value when a DCM is selected for a wavelength path $\lambda_n$ of a demand d. $UpperTolerance[d, \lambda_n, DCM]$ denotes an upper limit of dispersion tolerance at a wavelength path $\lambda_n$ of a demand d.

The first design unit 121 calculates Equation (1) incrementing the span count N. When a result (Minimize) of the calculation becomes non-zero, the first design unit 121 determines that a span count of N−1, one less than span count N at which the result becomes non-zero, forms a segment. If the span count N reaches MSN (N=MSN) while the calculation result (Minimize) remains zero, the first design unit 121 determines that a span count of N=MSN forms a segment. The first design unit 121 determines that a combination of DCMs for spans of a span count of N−1 is a result of the designing for the spans within the segment.

At step S409 of FIG. 4, the second design unit 122 determines a segment according to the linear programming where combinations of DCMs for spans between nodes are variables, Equation (1) is an objective function, and Equations (2) through (5) and Equation (6) below are constraints.

$$\sum_{k=1}^{M} S[k] \neq 0 \Rightarrow S[M+1] = 1 \quad (6)$$

Equation (6) represents a constraint condition where if at least one path whose span count is M (M=1, 2, 3, ... ) or less is incapable of transmission (does not satisfy the transmission condition), paths whose span count is M+1 or more are deemed as incapable of transmission. In this way, the second design unit 122 can perform wavelength dispersion compensation design where, with respect to segment overlap, a path does not satisfy a transmission condition if the span count of the path is larger than the span count of a path that does not satisfy the transmission condition. Consequently, a user can avoid an unnatural design in which a path having a span count that is smaller than that of a path capable of transmission becomes incapable of transmission. The results of design are easy for the user to understand.

Another example of segment determination according to linear programming is explained. At steps S403 and S406 of FIG. 4, the first design unit 121 may determine a segment according to linear programming where Equation (7) is an objective function.

$$\text{Minimize: } \sum_{k=1}^{MSN} S[k] \quad (7)$$

Equation (7) expresses maximization of the number of span counts k for which all paths are capable of transmission, the span counts k being among span counts of MSN or less. The first design unit 121 determines that when Minimize of Equation (7) equals to 0, a span count of N≤MSN forms a segment. The first design unit 121 determines that a combination of DCMs for spans whose span count=MSN is a result of the designing within the segment.

If Minimize of Equation (7) is not equal to zero, the first design unit 121 determines that a span count=MSN−Minimize forms a segment. The first design unit 121 determines that a combination of DCMs for spans within span count=MSN−Minimize is a result of the designing in the segment. Similarly, the second design unit 122 may use Equation (7) as an objective function. With Equation (7) as the objective function, a segment can be determined by one calculation according to linear programming, whereby the amount of calculation is reduced.

Figures 8, 9, 10:
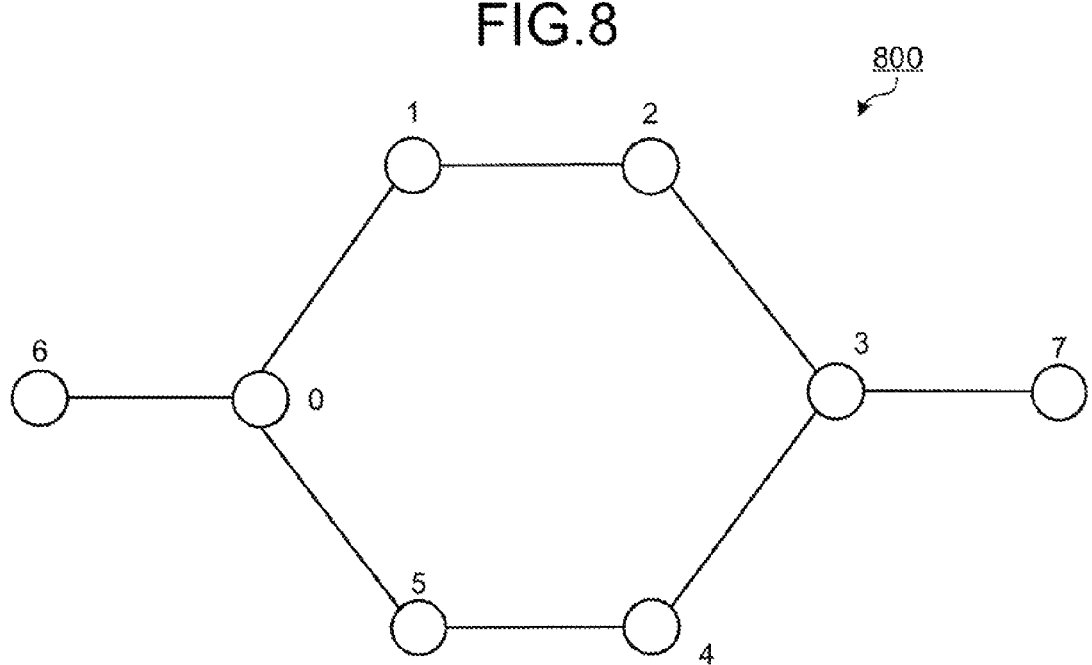
FIG. 8 is a diagram depicting an example of network topology indicated by network information.
FIG. 9 is a diagram depicting one example of dispersion values of spans.
FIG. 10 is a diagram depicting dispersion tolerance for span counts.

FIG. 8 is a diagram depicting an example of network topology indicated by the network information. It is assumed here that network information input into the input unit 110 indicates network topology of a network 800 depicted in FIG. 8. The network 800 includes nodes "0" through "7". For spans between the nodes, a DCM with a dispersion compensation level of −35 and a DCM with a dispersion compensation level of −45 can selectively be placed.

FIG. 9 is a diagram depicting one example of dispersion values of spans. The network information input into the input unit 110 includes, for example, Table 900 depicted in FIG. 9. Table 900 includes wavelength dispersion levels (dispersion values) occurring in each span of the nodes "0" through "7" depicted in FIG. 8. In Table 900, Span[x-y] indicates a span from node "x" to node "y". It is assumed here that a dispersion value of each span is 50.

FIG. 10 is a diagram depicting dispersion tolerance for span counts. The network information input into the input unit 110 includes, for example, Table 1000 depicted in FIG. 10. Table 1000 includes dispersion tolerances for each span count. ToleranceUpper denotes an upper limit of the dispersion tolerance. ToleranceLower denotes a lower limit of the dispersion tolerance.

As depicted in Table 1000, as the span count increases by one, ToleranceUpper decreases by 5 and ToleranceLower increases by 5. Therefore, the range of the dispersion tolerance narrows as the span count increases.

Figures 11, 12:
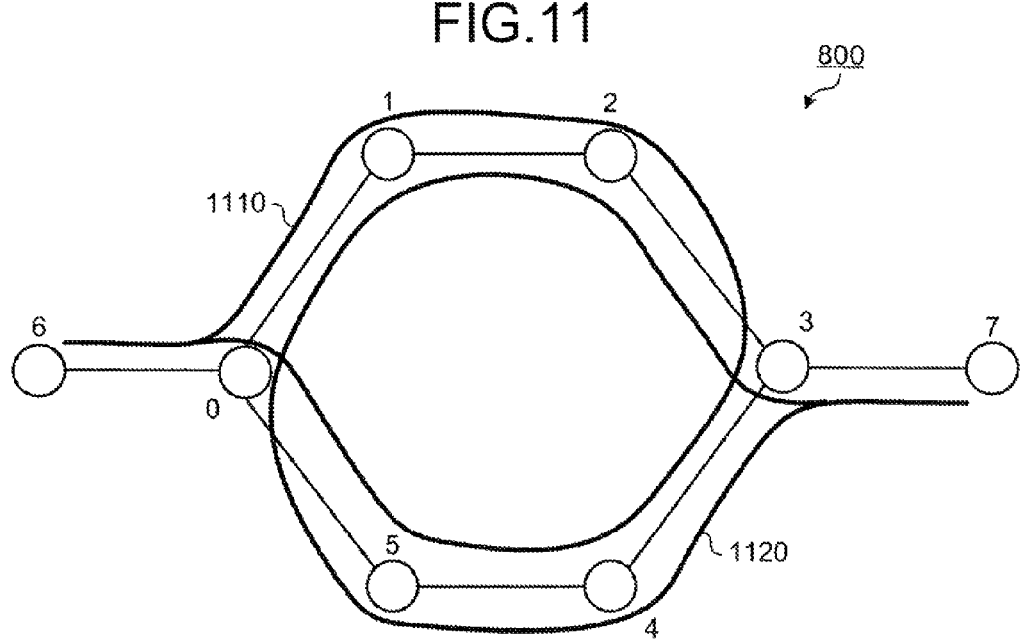
FIG. 11 is a diagram depicting segment determination under the conditions of FIGS. 8 to 10.
FIG. 12 is a diagram depicting one exemplary result of design by a first design unit.

FIG. 11 is a diagram depicting segment determination under the conditions of FIG. 8 through FIG. 10. Under the conditions of FIG. 8 through FIG. 10, the first design unit 121 sets a segment "1" centered around a node "0". It is assumed here that all paths in a segment whose span count is 3 from the node "0" are capable of transmission and paths in a segment whose span count is 4 from the node "0" are incapable of transmission. In this case, the segment "1" (reference numeral 1110) centered around the node "0" includes nodes "0" through "6".

Since the wavelength dispersion compensation design for a span between nodes "3" and "7" has not finished yet, either node "3" or "7" is selected and a segment centered around the selected node is determined. It is assumed here that the node "3" has been selected. It is also assumed that paths in a segment whose span count is 3 from the node "3" are capable of transmission and paths in a segment whose span count is 4 from the node "3" are incapable of transmission. In this case, nodes "0" through "5" and "7" are determined as a segment "2" centered around the node "3" (reference numeral 1120).

FIG. 12 is a diagram depicting one exemplary result of the design by the first design unit. Table 1200 in FIG. 12 depicts an exemplary result of the design by the first design unit 121. Specifically, column 1210 holds DCMs for the spans designed at the determination of the segment "1". Column 1220 of Table 1200 holds DCMs for the spans designed at the determination of the segment "2".

As can be seen from column 1210, in the segment "1", a DCM having a compensation level of −45 is selected for a span from the node "0" to the node "1" (Span[0-1]). Further, as can be seen from column 1220, in the segment "2", a DCM having a compensation level of −45 is selected for a span from the node "0" to the node "1" (Span[0-1]).

Since a span from the node "3" to the node "7" (Span[3-7]) is not included in the segment "1", a DCM for the span (Span[3-7]) is not selected. Since a span from the node "0" to the node "6" (Span[0-6]) is not included in the segment "2", a DCM for the span (Span[0-6]) is not selected.

FIG. 13 is a diagram depicting one exemplary result of the design by the second design unit. Table 1300 in FIG. 13 depicts one result of the wavelength dispersion compensation design performed by the second design unit 122, based on the result of the design illustrated in Table 1200 of FIG. 12. Specifically, column 1310 in Table 1300 holds DCMs for the spans designed by the second design unit 122. The second design unit 122 performs wavelength dispersion compensation design for an overlap of the segments "1" and "2" (the node "0" through the node "5").

In other words, the second design unit 122 selects DCMs for the spans between nodes "0" through "5" (Span[0-1], Span[1-2], Span[2-3], Span[3-4], Span[4-5], and Span[5-0]). In this example, since the results of the design for the overlap are identical for both segments "1" and "2", the results of the design in the segments "1" and "2" are adopted as the wavelength dispersion compensation design for the overlap.

As can be seen from column 1310 of Table 1300, a result of the design output from the design unit 120 indicates that DCMs having a compensation level of −45 are selected for the spans of Span[0-1], Span[2-3], and Span[4-5]. The result also indicates that DCMs having a compensation level of −35 are selected for the spans of Span[1-2], Span[3-4], Span[5-0], Span[0-6], and Span[3-7].

As explained, the network design apparatus 100 according to the embodiments performs, based on the network information and the path information, wavelength dispersion compensation design of nodes by using the constraint that a path whose span count is larger than a path that does not satisfy the transmission condition does not satisfy the transmission condition. Consequently, a user can avoid an unnatural design in which a path whose span count is smaller than that of a path capable of transmission becomes incapable of transmission. Results of the design are easy for the user to understand.

The network design apparatus 100 also groups nodes into segments in which paths satisfy the transmission condition. The network design apparatus 100 further performs wavelength dispersion compensation design using the constraint above for overlapping parts of the segments. Consequently, paths in the segments satisfy the transmission condition and an unnatural design with respect to the overlapping parts can be avoided.

The network design apparatus 100 selects a hub node that is not included in segments that have already been determined, and determines nodes within a certain range from the selected hub node to be a segment until no hub nodes remain. As a result, each segment is formed around a hub node so that a transmission condition preferentially satisfied for spans near a hub node where demand concentrates is.

For example, the network design apparatus 100 calculates a maximum value of the span count such that all paths of span count N or less from the selected hub node satisfy the transmission condition and determines nodes within the maximum span count from the selected hub node as a segment. In this way, paths in segments satisfy the transmission condition and the segments have overlapping parts.

Further, the network design apparatus 100 selects a hub node from among hub nodes that are not included in a segment, the hub node having the smallest span count from a given segment. As a result, segments centered around the hub node can be increased. A transmission condition for spans near a hub node where demand concentrates is preferentially satisfied.

The network design apparatus 100, when all hub nodes belong to a segment, selects a node that is not included in a segment and determines a segment centered around the selected node until all nodes belong to a segment. Consequently, nodes that are not included in a segment centered around a hub node are further grouped into segments so that the wavelength dispersion compensation design is performed with respect to all nodes.

For example, the network design apparatus 100 calculates a maximum value of the span count such that all paths of a span count N or less from the selected node satisfy the transmission condition and determines nodes within the maximum span count from the selected node as a segment. In this way, paths in segments satisfy the transmission condition and the segments have overlapping parts.

Further, the network design apparatus 100 selects a node from among nodes that are not included in a segment, the node having the largest span count from a given segment. As a result, nodes that are not included in a segment are efficiently grouped into segments and thus the amount of calculation is reduced.

The network design apparatus 100, when there is a span that is not included in a segment, selects the node at either end of the span and determines a segment centered around the selected node. Consequently, the wavelength dispersion of all spans is considered in the wavelength dispersion compensation design.

The network design apparatus 100 performs wavelength dispersion compensation design according to linear programming. As a result, wavelength dispersion compensation design satisfying the transmission condition is efficiently performed. However, wavelength dispersion compensation design explained herein may be performed without the linear programming. For instance, all combinations of DCMs for the spans are calculated and a combination that satisfies the objective function of Equation (1) is obtained.

As explained, according to the embodiments, a path whose span count is larger than a span count of a path that does not satisfy a transmission condition does not satisfy the transmission condition, thus an unnatural design is avoided. A user can easily understand a result of the design.

The network design method according to the embodiments can be implemented by an execution of a program on a computer such as a personal computer and a workstation, the program being prepared in advance. The program is recorded on a computer-readable recording medium such as a hard disk, a flexible disk, a CD-ROM, an MO, and a DVD, and is executed by being read out from the recording medium by a computer. The program can be a transmission medium that can be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A network design apparatus comprising:
   an input unit configured to receive network information that indicates nodes connected by optical transmission paths and path information that indicates paths between the nodes;
   an design unit configured to perform, based on the network information and the path information, wavelength dispersion compensation design using a constraint condition that a path whose span count is larger than a span count of another path that does not satisfy a transmission condition does not satisfy the transmission condition; and
   an output unit configured to output a result obtained by the design unit, wherein the design unit comprises:
      a first design unit that groups the nodes into segments in which paths satisfy the transmission condition; and
      a second design unit that performs the wavelength dispersion compensation design for overlapping parts of the segments using the constraint condition, and
   the output unit outputs a result obtained by the second design unit.

2. The network design apparatus according to claim 1, wherein
   the first design unit selects a hub node that is not included among the segments and determines nodes within a range from the hub node as a segment, until all hub nodes are included among the segments.

3. The network design apparatus according to claim 2, wherein
   the first design unit calculates a maximum span count such that paths within a span count from the hub node satisfy the transmission condition, and determines nodes within the maximum span count from the hub node as a segment.

4. The network design apparatus according to claim 2, wherein
   the first design unit selects a hub node from among hub nodes that are not included among the segments, the selected hub node having a smallest span count from the segments.

5. The network design apparatus according to claim 2, wherein
   the first design unit selects, after all hub nodes belong to the segments, a node that is not included among the segments, and determines nodes in a range from the selected node as a segment, until all such nodes are included among the segments.

6. The network design apparatus according to claim 5, wherein
   the first design unit calculates a maximum span count such that paths within a span count from the selected node satisfy the transmission condition, and determines nodes within the maximum span count from the selected node as a segment.

7. The network design apparatus according to claim 5, wherein
   the first design unit selects a node from among nodes that are not included among the segments, the selected node having a largest span count from the segments.

8. The network design apparatus according to claim 6, wherein
   the first design unit selects, when there is a span that is not included among the segments, a node at either end of the span and determines a segment centered around the selected node.

9. The network design apparatus according to claim 1, wherein
   the design unit performs the wavelength dispersion compensation design according to linear programming.

10. The network design apparatus according to claim 9, wherein
    the design unit performs the linear programming using an objective function that maximizes a number of paths that satisfy a transmission condition.

11. A network design method comprising:
    receiving network information that indicates nodes connected by optical transmission paths and path information that indicates paths between the nodes;
    performing, based on the network information and the path information, wavelength dispersion compensation design using a constraint condition that a path whose span count is larger than a span count of another path that does not satisfy a transmission condition does not satisfy the transmission condition; and
    outputting a result obtained at the performing, wherein the performing comprises:
       grouping the nodes into segments in which paths satisfy the transmission condition; and
       performing the wavelength dispersion compensation design for overlapping parts of the segments using the constraint condition.

12. A non-transitory, computer-readable recording medium storing therein a network design program causing a computer to execute a process comprising:
    receiving network information that indicates nodes connected by optical transmission paths and path information that indicates paths between the nodes;
    performing, based on the network information and the path information, wavelength dispersion compensation design using a constraint condition that a path whose span count is larger than a span count of another path that does not satisfy a transmission condition does not satisfy the transmission condition; and
    outputting a result obtained at the performing, wherein the performing comprises:
       grouping the nodes into segments in which paths satisfy the transmission condition; and
       performing the wavelength dispersion compensation design for overlapping parts of the segments using the constraint condition.

* * * * *